(12) United States Patent
Dowe et al.

(10) Patent No.: US 8,697,814 B2
(45) Date of Patent: Apr. 15, 2014

(54) PROCESS FOR PRODUCING A MOLDING COMPOSITION OR A MOLDING WITH AN INCREASE IN THE MELT STIFFNESS

(75) Inventors: Andreas Dowe, Borken (DE); Reinhard Beuth, Marl (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 197 days.

(21) Appl. No.: 13/063,134

(22) PCT Filed: Nov. 17, 2009

(86) PCT No.: PCT/EP2009/065289
§ 371 (c)(1),
(2), (4) Date: Mar. 9, 2011

(87) PCT Pub. No.: WO2010/063568
PCT Pub. Date: Jun. 10, 2010

(65) Prior Publication Data
US 2011/0165358 A1    Jul. 7, 2011

(30) Foreign Application Priority Data

Dec. 1, 2008   (DE) .................. 10 2008 044 225

(51) Int. Cl.
*C08L 69/00* (2006.01)
*C08J 5/00* (2006.01)
*B29C 45/00* (2006.01)

(52) U.S. Cl.
USPC ........... 525/433; 525/420; 264/239; 264/240; 264/241; 264/311; 264/328.1; 264/331.19

(58) Field of Classification Search
USPC ............... 525/433, 420; 264/240, 241, 328.1, 264/311.11, 331.19, 239
See application file for complete search history.

(56) References Cited

U.S. PATENT DOCUMENTS

| | | | |
|---|---|---|---|
| 6,677,015 B2 * | 1/2004 | Himmelmann et al. | 428/35.7 |
| 6,884,485 B2 | 4/2005 | Baumann et al. | |
| 7,005,481 B1 * | 2/2006 | Lehmann et al. | 525/433 |
| 7,582,342 B2 * | 9/2009 | Baumann et al. | 428/35.7 |
| 2005/0038201 A1 | 2/2005 | Wursche et al. | |
| 2006/0182916 A1 | 8/2006 | Dowe et al. | |
| 2006/0183869 A1 | 8/2006 | Dowe et al. | |
| 2007/0036998 A1 | 2/2007 | Dowe et al. | |
| 2010/0009106 A1 | 1/2010 | Dowe et al. | |
| 2010/0300572 A1 | 12/2010 | Dowe et al. | |
| 2010/0300573 A1 | 12/2010 | Dowe et al. | |
| 2012/0006465 A1 | 1/2012 | Dowe et al. | |

FOREIGN PATENT DOCUMENTS

| | | |
|---|---|---|
| DE | 1 741 540 | 1/2007 |
| DE | 10 2006 038108 | 2/2008 |
| DE | 10 2008 001 678 | 4/2009 |
| EP | 1 512 710 | 3/2005 |
| EP | 1 690 889 | 8/2006 |
| EP | 1 690 890 | 8/2006 |

OTHER PUBLICATIONS

U.S. Appl. No. 13/128,297, filed May 9, 2011, Dowe, et al.
U.S. Appl. No. 13/202,338, filed Aug. 19, 2011, Dowe, et al.
International Search Report issued May 4, 2010 in PCT/EP09/65289 filed Nov. 17, 2009.
U.S. Appl. No. 13/729,280, filed Dec. 28, 2012, Pawlik, et al.
U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,679, filed Oct. 11, 2012, Kuhmann, et al.

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

A polyamide molding composition is condensed up in the melt by means of a masterbatch containing a compound having at least two carbonate units and also a polyetheramide in which at least 50% of the end groups are present as amino end groups, whereupon the melt mixture is discharged and solidified to give a molding composition or a molding. The product obtained has an increased amino end group content and consequently an improved hydrolysis resistance.

20 Claims, No Drawings

PROCESS FOR PRODUCING A MOLDING COMPOSITION OR A MOLDING WITH AN INCREASE IN THE MELT STIFFNESS

This application is a U.S. Nation phase application under 35 U.S.C. §371 of PCT Application/EP2009/065289 filed on Nov. 17, 2009 which claims priority under 35 U.S.C. §119 (a)-(d) to DE 10 2008 044 225.9 filed on Dec. 1, 2008.

The invention relates to a process for producing a moulding composition composed of polyamide and polyetheramide having increased melt stiffness and also a process for producing corresponding mouldings.

WO 00/66650 discloses a process for condensing up polyamides, in which a compound having at least two carbonate units is used as additive to increase the molecular weight. The additive reacts with amino end groups of the polyamide to couple chains. Introduction of the additive in the form of a masterbatch allows more precise metering of the additive. Corresponding processes are known from EP 1 512 710 A2, EP 1 690 889 A1 and EP 1 690 890 A1. It has been found that improved extrudate quality is achieved by use of a masterbatch. According to this prior art, the masterbatch preferably comprises the polyamide which is to be condensed up or a polyamide compatible therewith as matrix material. As material for the masterbatch, preference is given to polyamides whose end groups are present predominantly as carboxylic acid groups. For example, according to EP 1 690 889 A1 at least 80%, at least 90% or at least 95% of the end groups are present as acid groups. This is also plausible since a larger proportion of amino end groups in the polyamide would lead to these reacting with the additive during production of the masterbatch and giving an undesirable increase in molecular weight, which would make incorporation of the masterbatch considerably more difficult. In addition, since part of the additive would have reacted, precise metering of the additive in the overall formulation would be made more difficult.

The processes according to EP 1 690 889 A1 and EP 1 690 890 A1 have proven useful, particularly in the production or coating of large pipes. However, in the case of such pipes which are used, for example, as inliner, structural layer or coating of transport, supply or disposal lines, for example for the transport of municipal heating, mains water, wastewater, gas, oils such as crude oil, fuel, petrochemicals, solvents, brines or alkalis, a considerable disadvantage is that the carboxyl end groups introduced via the masterbatch reduce the hydrolysis stability of the polyamide.

It is therefore an object of the invention to provide a process which allows the production of more hydrolysis-stable moulding compositions and mouldings having increased melt stiffness and a minimized content of carboxyl end groups.

This object is achieved by a process for producing a moulding composition or a moulding with condensing up of a polyamide moulding composition by means of from 0.005 to 10% by weight, based on the polyamide, of a compound having at least two carbonate units, which comprises the following steps:

a) a polyamide moulding composition based on a polyamide and if desired a polyetheramide is provided, with at least 50%, preferably at least 60%, particularly preferably at least 70%, in particular at least 80% and very particularly preferably at least 90%, of the end groups of the polyamide being present as amino end groups, the proportion of polyamide being from 10 to 99 parts by weight, preferably from 20 to 95 parts by weight, particularly preferably from 30 to 90 parts by weight and in particular from 40 to 85 parts by weight, and the proportion of polyetheramide being from 0 to 90 parts by weight, preferably from 0 to 80 parts by weight, particularly preferably from 0 to 70 parts by weight and in particular from 0.1 to 60 parts by weight, b) a mixture of the polyamide moulding composition and a masterbatch containing the compound having at least two carbonate units and a polyetheramide is produced, with the proportion of polyetheramide in the masterbatch being from 1 to 90 parts by weight, preferably from 5 to 80 parts by weight, particularly preferably from 10 to 70 parts by weight and in particular from 15 to 60 parts by weight, where the sum of the parts by weight of the polyamide of a), the polyetheramide of a) and the polyetheramide of b) is 100 and at least 50%, preferably at least 60%, particularly preferably at least 70%, in particular at least 80% and very particularly preferably at least 90%, of the end groups of the polyetheramide are present as amino end groups, c) the mixture is, if desired, stored and/or transported,
d) the mixture is mixed as a melt with the introduction of shear and
e) the melt mixture is discharged and solidified.

The resulting moulding composition or the resulting moulding thus contain from 10 to 99 parts by weight of polyamide and from 1 to 90 parts by weight of polyetheramide, preferably from 20 to 95 parts by weight of polyamide and from 5 to 80 parts by weight of polyetheramide, particularly preferably from 30 to 90 parts by weight of polyamide and from 10 to 70 parts by weight of polyetheramide and in particular from 40 to 85 parts by weight of polyamide and from 15 to 60 parts by weight of polyetheramide. The sum of the parts by weight of polyamide and polyetheramide is 100. In the case of multicomponent mouldings, this composition applies to the component, e.g. layer, composed of the polyamide/polyetheramide moulding composition of the invention; other components present, e.g. layers, can consist of other materials.

One polyamide which is suitable for the purposes of the invention is based on lactams, amino carboxylic acids, diamines or dicarboxylic acids. It can additionally contain building blocks which effect branching and are derived, for example, from tricarboxylic acids, triamines or polyethylenimine. Suitable types are, in each case as homopolymer or as copolymer, for example PA6, PA46, PA66, PA610, PA66/6, PA6/6T, PA66/6T and in particular PA610, PA612, PA810, PA108, PA812, PA128, PA814, PA148, PA1010, PA1012, PA1212, PA613, PA614, PA1014, PA8, PA9, PA10, PA11 or PA12.

In addition to the polyamide, the polyamide moulding composition from step a) can also contain, as further constituent, a polyetheramide based on lactams, amino carboxylic acids, diamines, dicarboxylic acids and polyetherdiamines which is preferably identical to the polyetheramide of the masterbatch. The same restrictions apply to the end groups as in the case of the polyetheramide of the masterbatch.

The starting polyamides preferably have molecular weights $M_n$ of greater than 5000, in particular greater than 8000. Use is made here of polyamides whose end groups are present at least partly as amino groups. For example, at least 50%, at least 60%, at least 70%, at least 80% or at least 90% of the end groups are present as amino end groups. The preparation of polyamides having a relatively high amino end group content using diamines or polyamines as regulators is prior art. In the present case, an aliphatic, cycloaliphatic or aralphatic diamine having from 4 to 44 carbon atoms is preferably used as regulator in the preparation of the polyamide. Suitable diamines are, for example, hexamethylenediamine, decamethylenediamine, 2,2,4- or 2,4,4-trimethyl-hexa-methylenediamine, dodecamethylenediamine, 1,4- diaminocyclohexane, 1,4- or 1,3-dimethyl-aminocyclohexane, 4,4'-diaminodicyclohexylmethane, 4,4'-diamino-3,3'-dimethyldicyclohexyl-methane, 4,4'-diaminodicyclohexylpropane, isophoronediamine, meta-xylylenediamine or para-xylylenediamine.

In a further preferred embodiment, a polyamine is used as regulator and simultaneously as crosslinker in the preparation of the polyamide. Examples are diethylenetriamine, 1,5-di-amino-3-(β-aminoethyppentane, tris(2-aminoethyl)amine, N,N-bis(2-aminoethyl)-N',N'-bis[2-[bis(2-aminoethyl) amino]ethyl]-1,2-ethanediamine, dendrimers and polyethyl-enimines, in particular branched polyethylenimines, which can be obtained by polymerization of aziridines (Houben-Weyl, Methoden der Organischen Chemie, Volume E20, pages 1482-1487, Georg Thieme Verlag Stuttgart, 1987) and generally have the following amino group distribution:
from 25 to 46% of primary amino groups,
from 30 to 45% of secondary amino groups and
from 16 to 40% of tertiary amino groups.

In a possible embodiment, the polyamide moulding composition can consist entirely of polyamide. However, it can also contain the usual additives which are used in the production of polyamide moulding compositions. Illustrative examples of these are colourants, additives which make laser inscription possible, flame retardants and flame inhibitors, stabilizers, fillers, blocking resistance improvers, mould release agents, impact modifiers, plasticizers, crystallization accelerators, antistatics, lubricants, processing aids and also further polymers which are usually compounded with polyamides. To scavenge carboxyl groups which can be formed during the ageing process, the polyamide moulding composition can also contain a bisoxazoline or oligooxazoline and/or a biscarbodiimide, oligocarbodiimide or polycarbodiimide.

Examples of these additives are as follows:
colourants: titanium dioxide, white lead, zinc white, liptones, antimony white, carbon black, iron oxide black, manganese black, cobalt black, antimony black, lead chromate, red lead, zinc yellow, zinc green, cadmium red, cobalt blue, Berlin blue, ultramarine, manganese violet, cadmium yellow, Sch-weinfurt green, molybdenum orange and red, chromium orange and red, iron oxide red, chromium oxide green, strontium yellow, molybdenum blue, chalk, ochre, umber, green earth, Terra di Siena burnt, graphite or soluble organic dyes.

Flame retardants and flame inhibitors: antimony trioxide, hexabromocyclododecane, tetrachlorobisphenol or tetrabromobisphenol and halogenated phosphates, borates, chloroparaffins and red phosphorus, also stannates, melamine cyanurate and its condensation products such as melam, melem, melon, melamine compounds such as melamine pyrophosphate and polyphosphate, ammonium polyphosphate, aluminium hydroxide, calcium hydroxide and also organophosphorus compounds which do not contain any halogens, for example resorcinol diphenyl phosphate or phosphonic esters.

Stabilizers: metal salts, in particular copper salts and molybdenum salts and also copper complexes, phosphites, sterically hindered phenols, secondary amines, UV absorbers and HALSs.

Fillers: glass fibres, glass spheres, milled glass fibres, kieselguhr, talc, kaolin, clays, $CaF_2$, aluminium oxides and carbon fibres.

Blocking resistance improvers and lubricants: $MoS_2$, paraffins, fatty alcohols and fatty acid amides.

Mould release agents and processing aids: waxes (montanates), montanic acid waxes, montanic ester waxes, esters of fatty acids and fatty alcohols, polysiloxanes, polyvinyl alcohol, $SiO_2$, calcium silicates and perfluorinated polyethers.

Plasticizers: BBSA, POBO.

Impact modifiers: polybutadiene, EPM, EPDM, HDPE, acrylate rubber, NBR, H-NBR.

Antistatics: carbon black, carbon fibres, graphite fibrils, steel fibres, polyhydric alcohols, fatty acid esters, amines, acid amides, quaternary ammonium salts.

Further polymers: ABS, polypropylene.

These additives can be used in the usual amounts known to those skilled in the art.

The moulding composition preferably contains at least 50% by weight, more preferably at least 60% by weight, particularly preferably at least 70% by weight, in particular at least 80% by weight and very particularly preferably at least 90% by weight, of the mixture of polyamide and polyetheramide.

Polyetheramides are known, for example, from DE-A-30 06 961; they contain a polyetherdiamine as comonomer.

In the polyetherdiamine, the polyether unit can be based on, for example, 1,2-ethanediol, 1,2-propanediol, 1,3-propanediol, 1,4-butanediol or 1,3-butanediol. The polyether unit can also have a mixed structure, for example with the units derived from the diols being arranged randomly or in blocks. The weight average molar mass of the polyetherdiamines is from 200 to 5000 g/mol and preferably from 400 to 3000 g/mol; their proportion in the polyetheramide is preferably from 4 to 60% by weight and particularly preferably from 10 to 50% by weight. Suitable polyetherdiamines can be obtained by conversion of the corresponding polyether diols by reductive amination or coupling to acrylonitrile with subsequent hydrogenation; they are commercially available, for example, in the form of the JEFFAMINE® D or ED grades or the ELASTAMINE® grades from Huntsman Corp. or in the form of the polyetheramine D series from BASF SE. A polyethertriamine, e.g. a JEFFAMINE® T grade, can also be used in small amounts if a branched polyetheramide is to be used. Preference is given to using polyetherdiamines which have an average of at least 2.3 carbon atoms in the chain per etheroxygen.

It has surprisingly been found that a polyetheramide which is rich in amino end groups does not react or reacts to only a small extent with the compound having two carbonate units in the melt, i.e. in the production of the masterbatch and also in processing steps d) and e). The reason for the low reactivity of the amino end groups of the polyether amide is unknown; steric hindrance is possibly the reason.

In the process of the invention, at least one compound having at least two carbonate units is used in a ratio of from 0.005 to 10% by weight, calculated relative to the polyamide used. This ratio is preferably in the range from 0.01 to 5.0% by weight, particularly preferably in the range from 0.05 to 3% by weight. Here, the term "carbonate" refers to esters of carbonic acid, in particular with phenols or alcohols.

The compound having at least two carbonate units can be low molecular weight, oligomeric or polymeric. It can consist entirely of carbonate units or can also have further units. These are preferably oligo- or polyamide, -ester, -ether, -ether esteramide or -etheramide units. Such compounds can be prepared by known oligomerization or polymerization processes or by polymer-analogous reactions.

In a preferred embodiment, the compound having at least two carbonate units is a polycarbonate, for example a polycarbonate based on bisphenol A, or a block copolymer containing such a polycarbonate block.

Suitable compounds having at least two carbonate units are comprehensively described in WO 00/66650, which is hereby expressly incorporated by reference.

The concentration of the compound having at least two carbonate units in the masterbatch is preferably from 0.15 to 50% by weight, particularly preferably from 0.2 to 25% by weight and in particular from 0.3 to 15% by weight. Such a masterbatch is produced in the customary manner known to those skilled in the art, in particular by mixing in the melt.

In the processing, the polyamide moulding composition to be condensed up is preferably mixed as pellets with the pellets of the masterbatch. However, it is also possible to produce a pellet mixture of the fully compounded polyamide moulding composition with the masterbatch and subsequently to transport or store it and then process it. Correspondingly, it is naturally also possible to employ powder mixtures. The critical factor is that the mixture is melted only during processing. Thorough mixing of the melt during processing is advisable. However, the masterbatch can equally well be introduced as melt stream into the melt of the polyamide moulding composition to be processed by means of a side extruder and then be thoroughly mixed in.

The invention can be applied to polyamides which, as a result of their production process, contain at least 5 ppm of phosphorus in the form of an acidic compound. In this case, from 0.001 to 10% by weight, based on the polyamide, of a salt of a weak acid is added to the polyamide moulding composition before compounding or during compounding. Suitable salts are disclosed in DE-A-103 37 707, which is hereby expressly incorporated by reference.

However, the invention can equally well be applied to polyamides which, as a result of their production process, contain less than 5 ppm of phosphorus or no phosphorus at all in the form of an acidic compound. In this case, an appropriate salt of a weak acid can but does not have to be added.

The melt mixture obtained by reaction of the polyamide moulding composition with the masterbatch is discharged and solidified. This can be effected, for example, in the following ways:

The melt is discharged as strand, for example cooled by means of a water bath and the strand is subsequently pelletized. The moulding composition obtained can subsequently be processed further to give mouldings.
The melt is extruded as profile, for example as pipe.
The melt is moulded to give a flexible tube which is applied as coating to a pipe.
The melt is extruded as film or plate; these can subsequently be, if desired, monoaxially or biaxially stretched and/or wound around a moulding element. The film or plate can also be deep-drawn before further processing.
The melt is extruded to give preforms which are subsequently shaped in a blow moulding process.
The melt is processed in an injection-moulding process to give a moulding.

The mouldings produced according to the invention are, in one embodiment, hollow bodies or hollow profiles, in particular ones having large diameters, for example liners, gas pipes, layers of offshore pipelines, subsea pipelines or supply lines, refinery lines, hydraulic lines, lines for chemicals, cable conduits, filling station supply lines, ventilation lines, air intake pipes, tank filling ports, storage containers and fuel tanks. Such mouldings can be produced, for example, by extrusion, coextrusion or blow moulding including suction blow moulding, 3-D blow moulding, parison insertion and parison manipulation processes. These processes are prior art.

The wall of these hollow bodies or hollow profiles can either be in the form of a single layer and in this case consist entirely of the moulding composition used according to the invention, but it can also be made up of a plurality of layers, with the moulding composition used according to the invention being able to form the outer layer, the inner layer and/or the middle layer. The wall can comprise a multiplicity of layers; the number of layers depends on the use. The other layer or layers comprise moulding compositions based on other polymers, for example polyethylene, polypropylene, fluoropolymers, or metal, for example steel. For example, the flexible pipes used for offshore pipelines are made up of a plurality of layers; they generally comprise a steel structure which contains at least one polymer layer and generally at least two polymer layers. The inner structure of such flexible tubes is, for example, described in WO2006/097678. The polymer layers assume, firstly, the function of sealing off the pipe so that the fluid transported cannot escape and secondly, when the layer is on the outside, the function of protecting the steel layers against the surrounding seawater. The polymer layer which forms the seal against the fluid being transported is, in one embodiment, extruded onto an interior carcass. This polymer layer, frequently also referred to as barrier layer, can, as described above, in turn comprise a plurality of polymer layers.

The use of polyetheramide in the masterbatch advantageously enables the flexibility of the moulding composition to be increased so that further plasticization by means of external plasticizers may be able to be dispensed with. This has the advantage that the material's properties remain constant even on contact with strongly extractive media, e.g. supercritical carbon dioxide.

The invention is illustrated by way of example below. In the example, the following materials are used:

PA12: 56 meq/kg of $NH_2$ groups and 16 meq/kg of COOH groups; viscosity number in accordance with EN ISO 307, measured as 0.5 percent strength by weight solution in m-cresol at 25° C.: 220 ml/g. The pellets contain 0.1% by weight of Ceasit® PC, based on the total amount.

PEA: Polyetheramide prepared from the following components:
47.452 kg of laurolactam
4.781 kg of dodecanedioic acid
42.767 kg of Elastamine® RP-2005
0.095 kg of hypophosphorous acid (as 50% strength aqueous solution)
The product had the following parameters:
26 meq/kg of $NH_2$ groups
11 meq/kg of COOH groups
Viscosity number in accordance with EN ISO 307: 200 ml/g.

Brüggolen® M1251: Mixture of a low-viscosity polycarbonate and an acid-terminated PA6.
Ceasit® PC: Calcium stearate.

Production of the Masterbatch:
The following materials were mixed in the melt on a Werner & Pfleiderer ZSK 30 twin-screw extruder at 240° C., extruded and pelletized:
96.9 parts by weight of PEA,
3.0 parts by weight of Brüggolen® M1251 and
0.1 part by weight of Ceasit® PC.

The product had a viscosity number in accordance with EN ISO 307 of 223 ml/g. No appreciable increase in the molecular weight therefore took place.

Production of a Pipe:
A pellet mixture of 75 parts by weight of PA12 and 25 parts by weight of the masterbatch was processed on a Reifenhäuser 50 single-screw extruder having a three-zone screw and L=25D at 250° C. and extruded as a pipe having a wall thickness of 2.9 mm and an external diameter of 32 mm.

The material of the pipe had a viscosity number in accordance with EN ISO 307 of 275 ml/g.

The invention claimed is:

1. A process for producing a molding composition or a molding, the process comprising:
    a) mixing
        (i) a polyamide molding composition, comprising a polyamide with at least 50% of its end groups being present as amino end groups and a proportion of the polyamide being from 10 to 99 parts by weight, and
        (ii) a masterbatch comprising a compound having at least two carbonate units and also a polyetheramide, with a proportion of polyetheramide in the masterbatch being from 1 to 90 parts by weight, to obtain a mixture
    wherein a sum of parts by weight of the polyamide and the polyetheramide is 100 and at least 50% of polyetheramide end groups are present as amino end groups;
    b) optionally, storing, transporting, or storing and transporting the mixture;
    c) mixing the mixture as a melt and introducing shear, to obtain a melt mixture; and
    d) discharging the melt mixture, to obtain a discharged melt mixture, and
    e) solidifying the discharged melt mixture, to obtain the molding composition or molding,
    wherein the polyamide molding composition e) comprises 0.005 to 10% by weight, based on the polyamide, of the compound having at least two carbonate units.

2. The process of claim 1, wherein
the polyamide molding composition e) further comprises from 0.1 to 90 parts by weight of the polyetheramide, where a sum of the parts by weight of the polyamide and the polyetheramide of the polyamide molding composition and the polyetheramide of the masterbatch is 100 and at least 50% of polyetheramide end groups are present as amino end groups.

3. The process of claim 1, wherein
the molding composition or molding e) comprises from 10 to 99 parts by weight of the polyamide and from 1 to 90 parts by weight of the polyetheramide, and the sum of the parts by weight of the polyamide and polyetheramide is 100.

4. The process of claim 1, wherein, in the case of a multicomponent molding, a component comprising the molding composition e) produced by the method of claim 1 comprises from 10 to 99 parts by weight of the polyamide and from 1 to 90 parts by weight of the polyetheramide, and the sum of the parts by weight of the polyamide and polyetheramide is 100.

5. The process of claim 1, wherein the molding composition or molding e) comprises at least 50% by weight of the mixture of the polyamide and polyetheramide.

6. The process of claim 1, wherein a polyetherdiamine present as comonomer in the polyetheramide has a weight average molar mass of from 200 to 5000 g/mol and its proportion in the polyetheramide is from 4 to 60% by weight.

7. The process of claim 1, wherein a concentration of the compound having at least two carbonate units in the masterbatch is from 0.15 to 50% by weight.

8. A molding composition, produced by the process of claim 1.

9. A molding produced, by the process of claim 1.

10. The molding of claim 9, in the form of a profile, a plate, or a film.

11. A molding of claim 9, in the form of a liner, a gas pipe, a layer of an offshore pipeline, a layer of a subsea pipeline, a layer of a supply line, a refinery line, a hydraulic line, a line for at least one chemical, a cable conduit, a filling station supply line, a ventilation line, an air intake pipe, a tank filling port, a storage container, or a fuel tank.

12. The process of claim 2, wherein the molding composition or molding e) comprises from 10 to 99 parts by weight of the polyamide and from 1 to 90 parts by weight of the polyetheramide, and the sum of the parts by weight of the polyamide and polyetheramide is 100.

13. The process of claim 2, wherein, in the case of a multicomponent molding, a the component comprising the molding composition e) produced by the method of claim 2 comprises from 10 to 99 parts by weight of the polyamide and from 1 to 90 parts by weight of the polyetheramide, and the sum of the parts by weight of polyamide and polyetheramide is 100.

14. The process of claim 3, wherein, in the case of a multicomponent molding, a the component comprising the molding composition e) produced by the method of claim 3 comprises from 10 to 99 parts by weight of the polyamide and from 1 to 90 parts by weight of the polyetheramide, and the sum of the parts by weight of polyamide and polyetheramide is 100.

15. The process of claim 2, wherein the molding composition or molding e) comprises at least 50% by weight of the mixture of the polyamide and polyetheramide.

16. The process of claim 3, wherein the molding composition or molding e) comprises at least 50% by weight of the mixture of the polyamide and polyetheramide.

17. The process of claim 4, wherein the molding composition or molding e) comprises at least 50% by weight of the mixture of the polyamide and polyetheramide.

18. The process of claim 2, wherein a polyetherdiamine present as comonomer in the polyetheramide has a weight average molar mass of from 200 to 5000 g/mol and its proportion in the polyetheramide is from 4 to 60% by weight.

19. The process of claim 3, wherein a polyetherdiamine present as comonomer in the polyetheramide has a weight average molar mass of from 200 to 5000 g/mol and its proportion in the polyetheramide is from 4 to 60% by weight.

20. The process of claim 4, wherein a polyetherdiamine present as comonomer in the polyetheramide has a weight average molar mass of from 200 to 5000 g/mol and its proportion in the polyetheramide is from 4 to 60% by weight.

* * * * *